May 1, 1945.　　　S. I. HITCHCOCK　　　2,374,998
PERMANENT MAGNET ELECTRIC MOTORS
Filed Sept. 1, 1942　　　3 Sheets-Sheet 1

INVENTOR:
STANLEY ISAIAH HITCHCOCK
BY
Haseltine, Lake & Co.
ATTORNEYS.

May 1, 1945.　　　S. I. HITCHCOCK　　　2,374,998
PERMANENT MAGNET ELECTRIC MOTORS
Filed Sept. 1, 1942　　　3 Sheets-Sheet 2
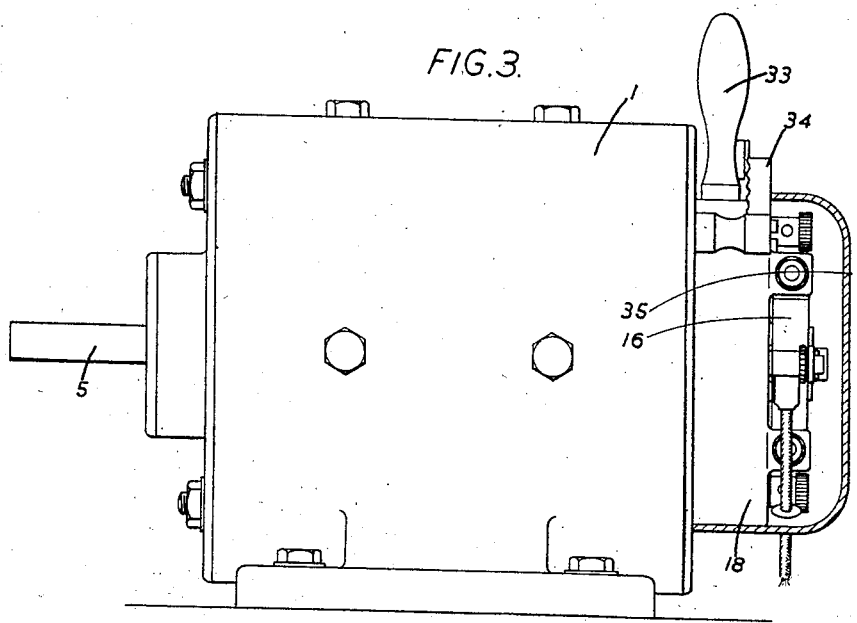
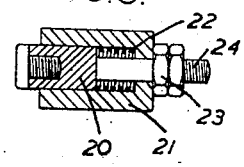
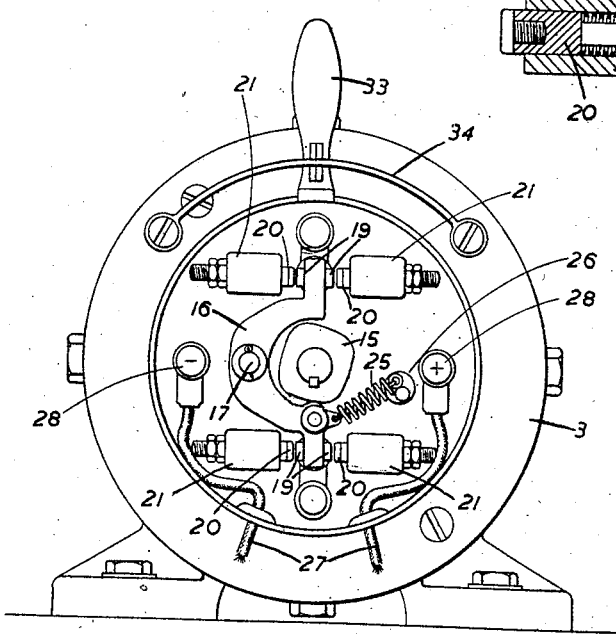
STANLEY ISAIAH HITCHCOCK INVENTOR
BY
Haseltine, Lake & Co.
ATTORNEYS.

May 1, 1945.   S. I. HITCHCOCK   2,374,998
PERMANENT MAGNET ELECTRIC MOTORS
Filed Sept. 1, 1942   3 Sheets-Sheet 3

INVENTOR:
STANLEY ISAIAH HITCHCOCK
BY
Haseltine, Lake & Co.
ATTORNEYS.

Patented May 1, 1945

2,374,998

UNITED STATES PATENT OFFICE 2,374,998

PERMANENT MAGNET ELECTRIC MOTOR

Stanley Isaiah Hitchcock, London S.E.1, England, assignor to Tropical Plantations Limited, London, England, a British company Application September 1, 1942, Serial No. 456,850
In Great Britain January 31, 1941

5 Claims. (Cl. 172—36)

This invention relates to permanent magnet electric motors which incorporate one or more permanent magnets in the moving or fixed magnet system, i. e. in the rotor or stator.

One of the objects of the invention is to evolve a permanent magnet electric motor having a continuously variable speed range from zero to its maximum rotational speed in either direction, and without varying the voltage of the energizing current, which will be capable of high rotational speeds but which, nevertheless, will be capable of exerting a high torque at low speed.

A further object of the invention is to simplify the construction of such permanent magnet electric motors and thereby reduce the cost of manufacture by simplifying the construction of the moving or fixed permanent magnet systems hereinafter referred to by the terms "rotor" and "stator."

A permanent magnet electric motor in accordance with the present invention for operation by direct current comprises a moving magnet system or rotor and a stationary magnet system or stator, one system comprising one or more permanent magnets having a plurality of pole pieces, the other system comprising one or more electrically energized magnets having a plurality of pole pieces, the permanent magnet or magnets being so arranged and the electric magnets so wound that succeeding poles of each system in the path of rotation will be of like polarity and a cam operated quick action make-and-break type contact breaker in circuit with the windings of the electrically energized magnets for periodically making and breaking the electrical circuit, thereby periodically energizing the electric magnets, the relative position of the contact breaker and its actuating cam being adjustable for the purpose of varying the phase of operation of the motor and thereby controlling the speed and direction of rotation.

By substituting a cam operated quick action make-and-break type contact breaker for the usual commutator or distributor, the contact breaker being angularly adjustable about the axis of the motor shaft, a simple control is obtained for varying the rotational speed of the motor from zero to its maximum, the speed of the motor being decreased or increased by moving the contact breaker in the direction of rotation or in the reverse direction. Furthermore, by moving the contact breaker about the axis of the motor shaft to a sufficient extent, rotational movement of the motor can be reversed without breaking or reversing the external connections or varying the sequence of operations of the motor.

The make-and-break type contact breaker in addition to having the above advantages also provides a means whereby the flow of current through the field windings of the electrically energized magnets will be reversed periodically, the contact breaker for this purpose being provided with additional contacts which come into operation to effect reversal of the current, the contact breaker in its preferred form being therefore of a different construction to the usual type employed on magneto generators.

Spring blade type contact breakers have been proposed in the construction of permanent magnet electric motors for the purpose of successively energizing and de-energizing the field windings as the rotor rotated the contacts being operated by an eccentric on the rotor shaft. In one prior construction of constant speed direct current motor, the period of contact between each pair of spring blade contacts was controlled by a governor operated cam, the speed of the motor being thereby maintained constant. In such electric motors permanent magnets of disc form carried by the rotor shaft were employed but the magnets were so magnetized that their magnetic axes lay radially to the shaft.

The use of a cylindrical permanent magnet has already been proposed in the case of a magneto generator, the cylindrical magnet being bored to receive the rotor shaft and being magnetized in such a way that its magnetic axis lay co-axial with the axis of the rotor shaft on which it was mounted. Furthermore the magnet at its ends carried laminated pole pieces, the pole pieces actually surrounding the permanent magnet, the magnet and pole pieces being clamped in position on the shaft, the pole pieces co-operating with the pole pieces of an electrically energized magnet constituting the fixed magnet system.

In order that the said invention may be clearly understood and readily carried into effect, the same will now be described more fully with reference to the accompanying drawings, wherein:

Figure 3 illustrates the motor in side elevation, the casing of the make-and-break type contact breaker being shown in section to disclose the contact breaker;

Figure 4 is an end elevation of the motor illustrating the construction of the contact breaker in detail;

Figure 5 is a sectional view on an enlarged scale of one of the spring-urged fixed contacts of the contact breaker;

Figure 1:
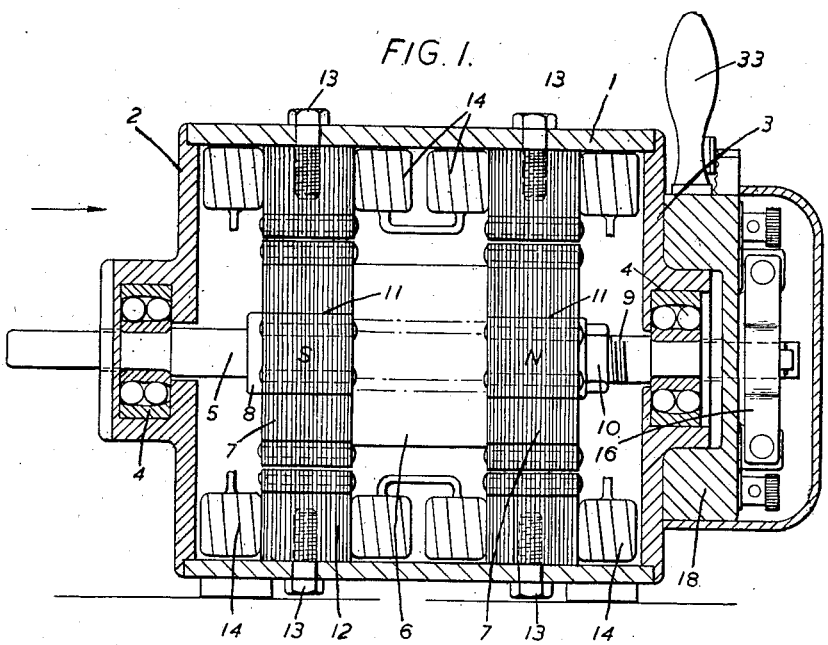
Figure 1 is a longitudinal vertical section of an electric motor constructed in accordance with the invention.

The permanent magnet electric motor illustrated includes a cylindrical casing 1 composed of a metal permeable to lines of magnetic force, the casing being closed at its ends by cover plates 2 and 3 which carry ball or other bearings 4 for supporting the non-magnetic motor shaft 5. The shaft 5 carries a permanent magnet 6 of cylindrical or ring shape, the magnet being magnetized in such a way that its magnetic axis lies co-axial with the axis of the motor shaft. In this connection it has been found that better results can be obtained if the casting from which the magnet is to be constructed is subjected to the magnetic effect of an electric current during the cooling or annealing process, the electric current being passed through a conductor arranged helically around the axis of the cylindrical casting, the theory of this treatment being that the molecules of metal tend to set in a position in which they lie parallel with the axis of the magnet.

Disposed at each end of the permanent magnet 6 is a set of pole pieces 7 composed of a material permeable to lines of magnetic force, each set of pole pieces being built up, for example, from a number of laminations riveted or otherwise secured together in intimate contact. The permanent magnet 6 is sandwiched between the two sets of pole pieces, the magnet and the two sets of pole pieces being clamped together in position upon the motor shaft 5, and for this purpose the motor shaft is formed with an annular shoulder 8 and is screw threaded at 9 to receive a securing nut 10, the latter when tightened up maintaining the permanent magnets and sets of pole pieces in position upon the shaft and in intimate contact. Each set may, for example, comprise four pole pieces 11 which project beyond the periphery of the permanent magnet, the pole pieces being equidistantly spaced about the axis of the motor shaft.

In order to prevent the permanent magnet being short circuited, the motor shaft 5 is composed of a material impermeable to lines of magnetic force, such as a non-ferrous alloy.

Secured to the inner surface of the casing 1 are a number, for example 8, electrically energized magnets, each magnet core 12 being for example of a laminated construction and being maintained in position opposite a pole piece 11 by means of securing stud 13. Each core is provided with a surrounding field winding 14 through which an energizing electric current is adapted to be passed, the windings being connected together in series or in any other suitable manner.

By the employment of a permanent magnet such as is hereinbefore described, and by arranging the sets of pole pieces at its opposite ends, succeeding poles of the moving magnet system in the path of rotation will be of like polarity, that is to say, the set of pole pieces at the one end of the magnet will all be of south polarity, whilst the set at the opposite end of the magnet will all be of north polarity. The field windings of the electrically energized magnets are so wound that succeeding magnet cores in the path of rotation of the rotor will be of like polarity, all the magnet cores at one end of the motor being of north polarity and all the magnet cores at the opposite end of the motor of south polarity. Although during the operation of the motor all the magnet cores of the stator system may retain their respective polarities indefinitely, the flow of current through the field winding being merely interrupted periodically, it is preferred that the flow of current through the field windings shall be reversed periodically so as to reverse the polarity of the magnet cores of the stator system periodically and at the appropriate time to cause rotation of the moving magnet system or rotor.

Although in the construction illustrated a single permanent magnet is shown, two or more may be used if required and, in fact, a rotor of any desired length can be built up by threading on the motor shaft a series of suitably designed and arranged disc permanent magnets interspersed with sets of pole pieces. In this way a rotor of any desired total magnetic strength can be built up from component parts used in the construction of motors of smaller capacity and dimensions.

Figure 2:
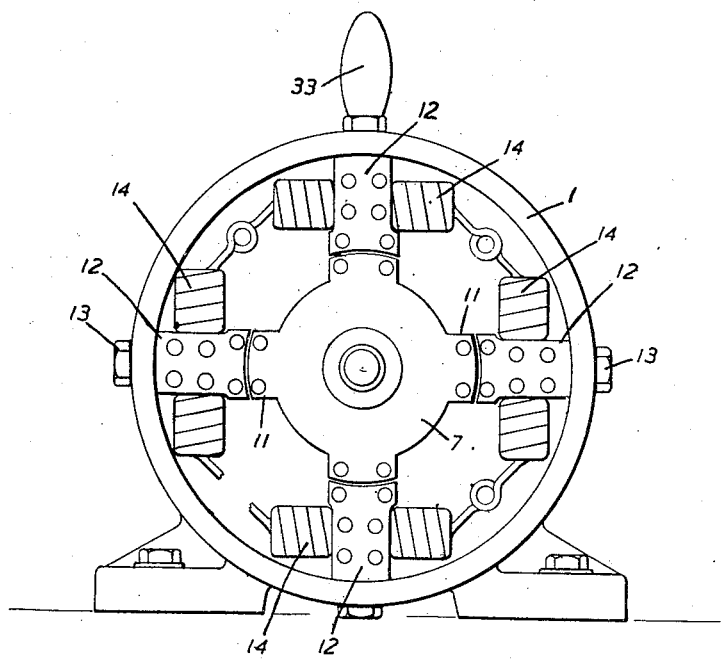
Figure 2 is an end elevation looking in the direction of the arrow in Figure 1, one of the casing cover plates having been removed.

The extremities of the magnet cores and pole pieces are preferably of arcuate shape as shown in Figure 2 to maintain the gap at a minimum.

The motor is operated from direct current supplied from the mains or from any other suitable source of supply, the flow of current through the field windings being rendered intermittent by means of a make-and-break type contact breaker hereinafter described, and which is actuated by a cam 15 secured to the motor shaft near one end. The contact breaker includes a double rocking arm 16 which is pivotally mounted at 17 upon a plate 18, the arm 16 carrying two pairs of moving contacts 19, each pair of contacts 19 cooperating with a pair of stationary contacts 20 illustrated in detail in Figure 5 and which are mounted in position upon the plate 18. Each of the stationary contacts 20 is located within a tubular sleeve 21 (see Figure 5) and is urged into its fully projected position by means of a coil spring 22, the amount which the contact projects from the sleeve being determined by means of adjusting nuts 23 which are in screw threaded engagement with the threaded shank 24 of the contact. The coil springs not only provide a cushioning effect during the action of making contact but, by adjusting the nuts 23, the time of actual contact between the contacts 19 and 20 can be varied, thus controlling the period of time during which the field windings of the fixed magnet system are energized.

The cam 15 in rocking the member 16, does so against the action of a coil spring 25 which is anchored at one end to the rocking arm and is attached at its opposite end to an anchorage member 26. The latter can be turned about its axis for adjustment purposes, the spring being attached to the member 26 at a point which is eccentrically arranged relative to the axis of the pin. In this way by rotating the pin 26 about its axis, the spring 25 can be tensioned to a greater or less extent and in this way a quicker making and breaking of the electrical circuit can be obtained.

Supply leads 27 serve to deliver current to the motor, the supply lead entering the motor by way of terminals 28 mounted in insulating bushings in the plate 18, the terminals being electrically connected with the stationary contacts 20, the negative terminal being connected with the adjacent pair of fixed contacts and the positive terminal connected to the other pair.

With the contacts in the position shown in Figure 4 the electrical circuit through the field windings is broken but upon the cam being rotated slightly in an anti-clockwise direction, the contact arm 16 will be rocked about the pivot 17, to cause two of the diagonally arranged contacts on the contact arm to make contact with two diagonally arranged stationary contacts. In that position the aforesaid stationary contacts will be electrically connected thereby completing the electrical circuit through the field windings. Movement of the cam 15 in the opposite direction will permit the spring 25 to pivot the rocking arm in the opposite direction and cause the remaining pair of contacts to be bridged, the contacts being so wired that the flow of current through the field windings will then take place in the opposite direction to hitherto. Although such reversal is not absolutely necessary to obtain rotational movement of the rotor, it has been found in the course of experiment that it sometimes gives beneficial results. It is preferred that when the pole pieces of the permanent magnets are situated substantially midway between the cores of the energized magnets there shall be no flow of current through the field windings, and that upon the parts approaching more closely together, the field windings shall be energized to set up an attractive force between the parts. The flow of current is once more discontinued when the pole pieces lie opposite the cores of the energized magnets, the flow of current being then reversed to produce a repellent force between the pole pieces and cores of the energized magnets and assist the pole pieces to swing past the cores, the electrical circuit being once more broken when the parts are in an intermediate position.

Alternatively, the field windings may be merely energized when the pole pieces of the permanent magnets are opposite or substantially opposite the cores of the electrically energized magnets, the direction of current flow being such that a repellant force is exerted between the magnets of the two systems, the flow of current being cut off at the point where the pole pieces of the permanent magnets lie intermediate the cores of the stationary energized magnets, further rotational movement of the moving magnet system resulting from the inductive effect between the pole pieces of the permanent magnet and the soft iron cores of the energized magnets, continuous rotation thus taking place. Alternatively, instead of energizing the magnet windings to produce a repellent effect, they may be energized to set up an attractive force between the poles of the two magnet systems in which case the electrical circuit will be completed just before the pole pieces of the permanent magnets approach the soft iron cores of the energized magnets, the electrical circuit being broken immediately the pole pieces lie directly opposite the cores, the momentum of the moving magnet system causing it to be swung past the fixed magnet system.

Figure 8:
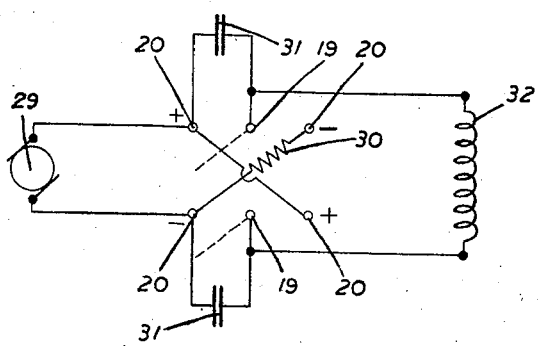
Figure 8 is an electrical wiring diagram of the motor.

The wiring arrangements of the motor are disclosed by Figure 8 of the drawings, the source of electric supply being indicated by a generator 29 which is connected with the contacts 20. The contacts 20 which have a negative polarity are connected together by way of a resistance 30 which is intended to limit the current passing through the field windings when the latter are energized to produce a repellent effect. Contacts 19 and 20 are bridged by condensers to prevent or minimize sparking at the contacts whilst the field winding or windings is or are represented by a single coil bearing the reference numeral 32.

In order to control the speed of the motor and reverse its direction of rotation when desired, the contact breaker is angularly movable about the axis of the motor shaft, the plate 18 which carries the contact breaker being provided with an operating handle 33 by which it can be angularly moved in the desired direction, the handle cooperating with a suitable guide or rack 34 on the end plate 3. By means of the handle 33 the contact breaker can be moved about the axis of the motor shaft in the direction of rotation of the motor or in the opposite direction, for the purpose of increasing or decreasing the speed of rotation of the motor and furthermore if desired to reverse the direction of rotation, the rotational speed of the motor being controlled merely by alteration in the angular position of the contact breaker and without the necessity of any form of voltage changing device.

The contact breaker may be disposed in a dish like casing or cover 35 which serves to protect the contacts from the action of dust and suppress any noise resulting from the inter-engagement of the stationary and moving contacts.

Figure 6:
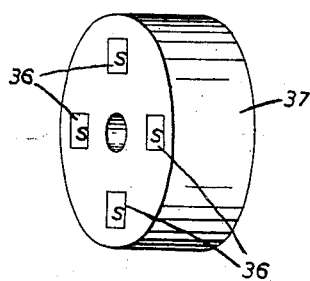
Figure 6 is a perspective view illustrating a modified set of permanent magnets.
Figure 7:
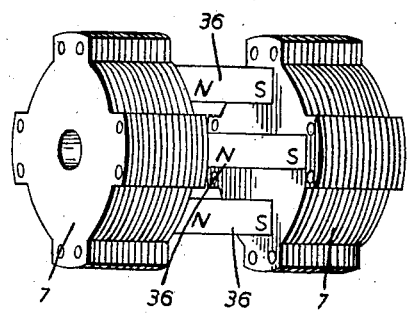
Figure 7 is a perspective view illustrating a further modification.

In lieu of the ring or cylindrical shaped permanent magnet, the moving magnet system may consist of bar magnets of short length arranged around the motor shaft and parallel therewith, succeeding poles of the magnets in the path of rotation being of like polarity. The short bar magnets 36 may be embedded in a synthetic resin moulding or casting 37 of a cylindrical shape such as is shown in Figure 6, the housing being bored axially to fit the motor shaft, the magnets at their ends contacting the two sets of pole pieces, or alternatively the magnets may actually be embedded in recesses formed in the sets of pole pieces as in the case of Figure 7.

By virtue of its simple character and construction such a motor can be easily and cheaply manufactured and it is found as a result of experiment that an extremely large speed range can be obtained, the motor however having a high electrical efficiency and being capable of giving a high torque output even at low speeds.

Any suitable alloy may be employed in the construction of the permanent magnet or magnets, but it is preferred to employ the alloy sold under the registered trade-mark "Ticonal."

What I claim and desire to secure by Letters Patent of the United States is:

1. A direct current motor comprising an armature shaft; an armature including permanent magnet means mounted on said shaft with the magnetic axis thereof coincident with the axis of the shaft, and means defining a plurality of radially projecting armature pole pieces at each end of said permanent magnet means; a plurality of magnetic field poles, one for cooperation with each armature pole piece; the field poles at opposite ends of the permanent magnet means being oppositely wound, a cam on said armature shaft, current reversing switch means operated by said cam for twice energizing said field poles in response to angular displacement of an armature pole piece a distance equal to that between adjacent field poles; said switch means changing the direction of current flow with each action thereof whereby the armature pole piece is first repelled from an adjacent field pole and then attracted to the next field pole in the direction of armature rotation, and means supporting said reversing switch means for angular displacement relative to said cam and about the axis thereof to afford speed and directional control for said motor.

2. An electric motor as claimed in claim 1 in which the permanent magnet means is a plurality of bar magnets arranged around the armature shaft with all of the north poles in the same direction.

3. An electric motor as claimed in claim 1 in which the permanent magnet means is a cylindrical permanent magnet concentrically mounted on the armature shaft.

4. An electric motor as claimed in claim 1 in which the reversing switch means includes a resistance in series with that portion thereof which establishes the repulsion current in the field poles whereby the current intensity in repulsion is less than in attraction so as to prevent weakening of the permanent magnet.

5. An electric motor comprising, a moving magnet system constituting a rotor, a stationary magnet system constituting a stator, one system having permanent magnet pole pieces and the other having electromagnetic pole pieces, the arrangement of the permanent magnet pole pieces and the electromagnetic pole pieces being such that succeeding poles of each system in the path of rotation of the rotor are of like polarity, a cam on said rotor, switch means operated by said cam for energizing said electromagnetic pole pieces in response to angular displacement of said rotor a distance equal to that between adjacent pole pieces, said switch means including paired moving and stationary contacts, each stationary contact comprising a contact element, means for predetermining the position of said contact element relative to the coacting moving contact, resilient means for urging said contact element in the direction of said coacting moving contact whereby the period of contact is adjustable and arcing is minimized, and means for varying the relative positions of said cam and switch means to vary the phase of operation of the motor and thereby control the speed and direction of the rotor.

STANLEY ISAIAH HITCHCOCK.